US011913120B2

(12) United States Patent
Jordan et al.

(10) Patent No.: US 11,913,120 B2
(45) Date of Patent: Feb. 27, 2024

(54) THERMAL BARRIER COATINGS WITH CMAS RESISTANCE

(71) Applicant: The University of Connecticut, Farmington, CT (US)

(72) Inventors: Eric Jordan, Storrs, CT (US); Maurice Gell, Somerset, NJ (US); Rishi Kumar, Ashford, CT (US); Chen Jiang, Willimantic, CT (US)

( * ) Notice: Subject to any disclaimer, the term of this patent is extended or adjusted under 35 U.S.C. 154(b) by 0 days.

(21) Appl. No.: 17/878,868

(22) Filed: Aug. 1, 2022

(65) Prior Publication Data

US 2022/0372630 A1 Nov. 24, 2022

Related U.S. Application Data

(63) Continuation of application No. 15/808,817, filed on Nov. 9, 2017, now Pat. No. 11,401,611.

(51) Int. Cl.

*C23C 28/00* (2006.01)
*C23C 28/04* (2006.01)
*F01D 5/28* (2006.01)

(52) U.S. Cl.

CPC ........ *C23C 28/3455* (2013.01); *C23C 28/042* (2013.01); *C23C 28/044* (2013.01); *F01D 5/288* (2013.01); *F05D 2230/90* (2013.01); *F05D 2260/95* (2013.01); *F05D 2300/21* (2013.01); *F05D 2300/6111* (2013.01)

(58) Field of Classification Search

None
See application file for complete search history.

(56) References Cited

U.S. PATENT DOCUMENTS

| | | | | |
|---|---|---|---|---|
| 4,240,828 | A * | 12/1980 | Huseby .................. | C22C 19/00 420/443 |
| 2002/0018921 | A1 | 2/2002 | Yamada et al. | |
| 2003/0049500 | A1 * | 3/2003 | Takai .................... | C04B 35/634 428/702 |
| 2009/0169914 | A1 | 7/2009 | Fu et al. | |
| 2011/0236657 | A1 | 9/2011 | Feist et al. | |
| 2013/0273327 | A1 | 10/2013 | Sun et al. | |
| 2014/0377504 | A1 | 12/2014 | Sun et al. | |
| 2016/0257618 | A1 | 9/2016 | Jordan et al. | |

FOREIGN PATENT DOCUMENTS

WO 2013/163058 10/2013

OTHER PUBLICATIONS

Krause et al. "2ZrO2Y2O3 Thermal Barrier Coatings Resistant to Degradation by Molten CMAS: Part II, Interactions with Sand and Fly Ash" Journal of American Ceramic Society, 97 [12] 3950-3957 (2014), 4 pages.

Langman "Non-Final Office Action for U.S. Appl. No. 15/808,817" U.S. Patent & Trademark Office, dated Aug. 5, 2021, 15 pages.

Sample "Notice of Allowance for U.S. Appl. No. 15/808,817" U.S. Patent & Trademark Office, dated Mar. 16, 2022, 10 pages.

* cited by examiner

*Primary Examiner* — David Sample

(74) *Attorney, Agent, or Firm* — Intellectual Strategies

(57) ABSTRACT

A coating on a substrate is disclosed having layers including yttrium aluminum garnet (YAG) and yttrium aluminum monoclinic (YAM).

14 Claims, 3 Drawing Sheets

THERMAL BARRIER COATINGS WITH CMAS RESISTANCE

STATEMENT OF FEDERALLY SPONSORED RESEARCH

This invention was made with Government support under DE-SC0007544 awarded by the Department of Energy. The Government has certain rights to this invention.

FIELD

This invention relates to compositions, equipment and methods related to thermal barrier coatings and more particularly relates to thermal barrier coatings with outstanding CMAS resistance including coating with yttrium aluminum garnet (YAG) and yttrium aluminum perovskite (YAP).

BACKGROUND

Thermal barrier coatings (TBCs) are used to protect hot section components of equipment such as aircraft engines, marine propulsion systems, and industrial gas turbines, from the extreme temperatures of the associated gas. Advanced thermal barrier coatings are needed to satisfy more demanding durability requirements, such as those of industrial gas turbines operating at turbine inlet temperatures of 2650° F. (1454° C.) and beyond.

SUMMARY

A coating on a substrate is disclosed. The coating includes yttrium aluminum garnet (YAG) and yttrium aluminum perovskite (YAP). Other embodiments of the coating are also disclosed.

In some embodiments, the coating includes a layer of YAG and a layer of YAP between the layer of YAG and the substrate. In some embodiments, the coating includes a layer of a mixed phase of YAG and YAP. In some embodiments, the coating is a thermal barrier coating. In some embodiments, the layer of the mixed phase of YAG and YAP transitions from YAG at a top of the layer of the mixed phase of YAG and YAP to YAP at a bottom of the layer of the mixed phase of YAG and YAP. In some embodiments, the layer of the mixed phase of YAG and YAP comprises a consistent ratio of YAG and YAP. In some embodiments, the coating includes a layer of YAG, where the layer of the mixed phase of YAG and YAP is between the layer of YAG and the substrate.

In some embodiments, the coating includes a layer of YAP, where the layer of YAP is between the layer of the mixed phase of YAG and YAP and the substrate. 8 In some embodiments, the coating includes a layer of a mixed phase of YAP and yttria stabilized zirconia (YSZ), where the layer of the mixed phase of YAP and YSZ is between the layer of the mixed phase of YAG and YAP and the substrate. In some embodiments, the coating includes a layer of a mixed phase of YAP and yttrium aluminum monoclinic (YAM), where the layer of the mixed phase of YAP and YAM transitions from YAP at a top of the layer of the mixed phase of YAP and YAM to a ratio of YAP and YAM at a bottom of the layer of the mixed phase of YAP and YAM.

In some embodiments, the coating includes a layer of yttrium perovskite garnet (YPG) and a layer of yttrium monoclinic garnet (YMG), where the layer of YPG and the layer of YMG are between the layer of the mixed phase of YAG and YAP and the substrate. In some embodiments, the coating includes a layer of yttria stabilized zirconia (YSZ), where the layer of YSZ is between the layer of the mixed phase of YAG and YAP and the substrate. In some embodiments, the coating includes a layer of YAM, where the layer of YAM is between the layer of the mixed phase of YAG and YAP and the substrate. In some embodiments, the coating includes a layer of a mixed phase of YAM and YSZ, where the layer of the mixed phase of YAM and YSZ is between the layer of YAM and the substrate. In some embodiments, the coating includes a layer of a mixed phase of YAP and YAM, where the layer of the mixed phase of YAP and YAM is between the layer of the mixed phase of YAG and YAP and the substrate.

Another coating on a substrate includes a layer of YAG and a layer of YAP between the layer of YAG and the substrate. In some embodiments, the coating includes a layer of YAM, where the layer of YAM is between the layer of YAP and the substrate.

In some embodiments, the coating includes a layer of YSZ, where the layer of YSZ is between the layer of YAP and the substrate. In some embodiments, the coating includes a layer of a mixed phase of YAP and YAM, where the layer of the mixed phase of YAP and YAM is between the layer of YAP and the substrate. In some embodiments, the coating includes a layer of a mixed phase of YAM and YSZ, where the layer of the mixed phase of YAM and YSZ is between the layer of YAM and the substrate. In some embodiments, the layer of the mixed phase of YAM and YSZ transitions from YAM at a top of the layer of the mixed phase of YAM and YSZ to a ratio of YAM and YSZ at a bottom of the layer of the mixed phase of YAM and YSZ.

In some embodiments, the coating includes a layer of a mixed phase of YAP and YAM, where the layer of the mixed phase of YAP and YAM transitions from YAP at a top of the layer of the mixed phase of YAP and YAM to a ratio of YAP and YAM at a bottom of the layer of the mixed phase of YAP and YAM.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
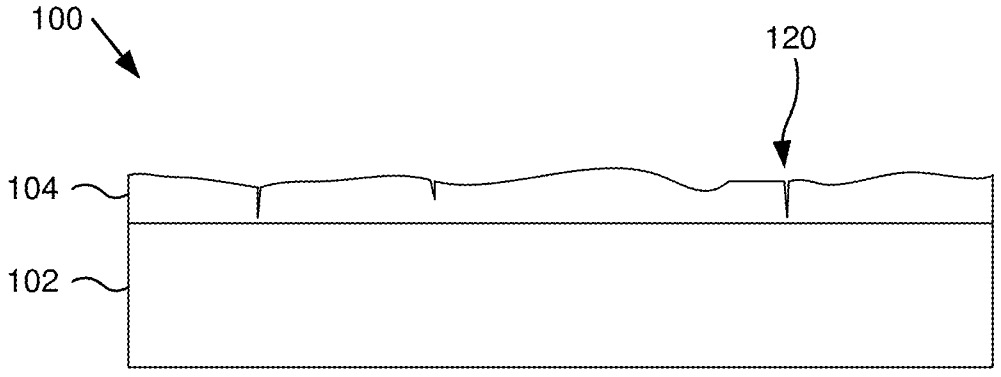
FIG. 1 is a schematic drawing depicting a substrate with a coating thereon in accordance with embodiments of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The subject matter of the present application has been developed in response to the present state of the art, and in particular, in response to the problems and disadvantages associated with conventional thermal barrier coatings that have not yet been fully solved by currently available techniques. Accordingly, the subject matter of the present application has been developed to provide embodiments of a system, an apparatus, and a method that overcome at least some of the above-discussed shortcomings of prior art techniques.

While many embodiments are described herein, at least some of the described embodiments facilitate the enhancement of the durability of coatings, including thermal barrier coatings. Protective coatings are used to protect underlying structures from exposure to harmful external effects. Thermal barrier coatings (TBCs) are widely used to protect hot section components of equipment such as aircraft engines, marine propulsion systems, and industrial gas turbines, from the extreme temperatures of the associated gas. Advanced thermal barrier coatings are needed to satisfy more demanding durability requirements.

Disclosed herein are methods of enhancing the durability of ceramic coatings. Embodiments of this invention also include methods of fabricating ceramic coatings. Embodiments of this invention further include equipment that has at least one or more components that may experience temperatures in excess of 700° C. that utilize these improved coatings and/or coatings processed using the methods described herein. Embodiments of this invention further include operation and use of equipment that has at least one or more components that utilize these improved coatings and/or coatings processed using the methods described here.

As used herein, the term "coating" describes a coating that may be used in any of the types of equipment described above. The embodiments describing the methods, use and equipment listed above also include any embodiment of the coating, alone or in combination, included in the rest of this document. A thermal barrier coating may be treated as a type of thermal barrier coating, and where the word "coating" is used in the rest of this document, it can, but does not necessarily, refer to a thermal barrier coating. Further, the word "coating" may refer to a coating produced by any technique, including without limitation, thermal spray (including plasma spray), physical vapor deposition (PVD) including electron beam physical vapor deposition (EB-PVD), chemical vapor deposition (CVD), solution based techniques such as sol-gel techniques, sputtering, any method conventionally referred to as "thin film deposition" and electrochemical deposition techniques. Further the word "coating" may refer to a coating of any thickness, and in particular to a coating of thickness between 1 micrometer and 10 millimeters. The word "coating" anywhere in this document may also refer specifically to a thermal barrier coating.

The word "equipment", unless otherwise explicitly specified, used anywhere in this document may refer to, without limitation, equipment that has at least one or more components that may experience high temperatures, for example but not limited to temperatures in excess of 700° C., including gas-fired engines and turbines, coil-fired engines and turbines, biomass-fired engines and turbines, boilers, chemical reactors, hot gas/liquid pipelines, fuel cells (including solid oxide fuel cell and molten carbonate fuel cell systems), and gas production/extraction/purification/concentration systems. Further, the word "equipment" includes any equipment that may at any time during assembly or operation have a function that requires at least one component, which may be a metal component, to experience a temperature below the temperature of the operating environment, or the temperature that the fluid (gas or liquid) in the operating component of that component may experience at the same time, or a time within a short duration prior (to account for the time taken for heat transfer). For example, the equipment may experience a temperature less than 25° C. below the temperature of the operating environment.

Also, the word "equipment" in this document may refer to any equipment that may at any time during assembly or operation be exposed a reactive solid species that is carried by a fluid. This reactive solid species may comprise, without limitation, particles or "ash". The reactive species may include, without limitation, particles that are introduced into the fluid from the environment around the equipment (e.g. dust particles in the air), or formed during the operation of the equipment (e.g. fly ash particles formed during combustion of coal, biomass etc).

High temperature components particularly in gas turbines benefit from thermal barrier coatings (TBCs) that insulate the underlying metal substrates from damaging high temperatures. Such coatings are susceptible to attacks by environmental contaminates at elevated temperatures especially made of calcium, magnesium, aluminum and silicon oxides (CMAS). The coated metals are always oxidized on exposure to high temperature gases (air in most cases) and will form a thermally grown oxide (TGO) layer that needs to be compatible with the TBC topcoat composition. Embodiments disclosed herein describe specific TBC compositions and geometries that will be more resistant to CMAS than the state-of-the-art TBC topcoats made of yttria stabilized zirconia (YSZ). It is understood in the following that all coatings ultimately go on substrates, such as metal substrates or ceramic composite substrates.

CMAS attacks YSZ TBCs in two ways. First, by reacting with the topcoat materials leading to phase transformation and property degradation. Second, by infiltrating cracks and pores causing the loss of coatings' micro-structural strain tolerance. Yttrium aluminum garnet (YAG) has desirable properties for a thermal barrier coating. Because of yttrium aluminum garnet's (YAG) near inert properties in reaction with CMAS, the main vulnerability with CMAS is infiltration into cracks. As such, coatings may require more than just YAG to properly resist CMAS.

Yttrium aluminum perovskite (YAP) and yttrium aluminum monoclinic (YAM), individually or together, when utilized in conjunction with YAG provide protection as they react with CMAS and form a solid apatite phase. Embodiments described herein provide coatings including both YAG and YAP. Further embodiments provide coatings including YAG, YAP, and YAM.

Because YAG and YAP are neighboring compounds on the equilibrium phase diagram they are thermodynamically stable with each other over a composition range from 62.50 atomic % aluminum with 37.50 atomic % yttrium on one end to 50.00 atomic % aluminum with 50.00 atomic % yttrium on the other end respectively. The same applies to YAP and YAM as well, from 50.00 atomic % aluminum with 50.00 atomic % yttrium on one end to 33.33 atomic % Aluminum with 66.67 atomic % yttrium on the other respectively.

Embodiments of the invention described utilizes the concept that CMAS blocking reactions that occur over a small fraction of the surface area of the coating within cracks can be sustained for a much longer time as the rate of consumption of reactive species is greatly reduced and secondly, multi-layer coatings where each layer is next to a layer with which it is thermodynamically stable will limit inter layer reactions forming new phases which may be harmful, among other reasons, due to molar volume changes that are mechanically destructive.

Some embodiments described herein are applicable to thermal barrier coatings that have interconnected porosity, usually 15 to 20 volume percent, which permits CMAS to penetrate from the coating surface to the bond line, applied by many processes including, but not limited to, solution precursor plasma spray (SPPS), air plasma spray (APS), electron-beam physical vapor deposition (EB-PVD), suspension plasma spray (SPS).

The porosity may be described as pores, cracks, channels, etc. A pore may refer to a crack in a coating fabricated by a thermal spray method, where the coating has a nominally high density between at least two of these cracks. Also, for instance, a pore may refer to a crack in a coating that may be referred to as a "dense vertically cracked" coating.

The inert properties of the YAG provides protection as CMAS blocking and the penetration into the pores, cracks, or channels is arrested by the YAP and/or YAM.

FIG. 1 is a schematic drawing depicting a substrate 102 with a coating 100 thereon. In some embodiments, the coating 100 includes a first protective layer 104. In some embodiments, the coating includes YAG and YAP. In some embodiments, the first protective layer 104 includes a layer of YAG and a layer of YAP between the layer of YAG and the substrate 102.

In some embodiments, the coating includes a layer of a mixed phase of YAG and YAP. A mixed phase of YAG and YAP includes a combination of YAG and YAP in varying concentrations. In some embodiments, a mixed phase is a two-phase mixture including a combination of two of YAG, YAP, YAM, or YSZ, etc. In some embodiments, a mixed phase is a three phase mixture including a combination of three of YAG, YAP, YAM, or YSZ, etc. As an example, a mixed phase may be applied to a substrate by spraying on two or more of YAG, YAP, YAM, or YSZ, etc. with varying concentrations.

In some embodiments, the mixed phase of YAG and YAP is fifty percent YAG and fifty percent YAP. In some embodiments, the mixed phase of YAG and YAP is sixty percent YAG and forty percent YAP. In some embodiments, the mixed phase of YAG and YAP is seventy five percent YAG and twenty five percent YAP. In some embodiments, the mixed phase of YAG and YAP is ninety five percent YAG and five percent YAP. In some embodiments, the mixed phase of YAG and YAP is ninety nine percent YAG and one percent YAP.

In some embodiments, the mixed phase of YAG and YAP is sixty percent YAP and forty percent YAG. In some embodiments, the mixed phase of YAP and YAG is seventy five percent YAP and twenty five percent YAG. In some embodiments, the mixed phase of YAP and YAG is ninety five percent YAP and five percent YAG. In some embodiments, the mixed phase of YAG and YAP is ninety nine percent YAP and one percent YAG.

In some embodiments, the mixed phase of YAG and YAP includes a consistent ratio of YAG and YAP throughout a thickness of the mixed phase. In some embodiments, the layer of the mixed phase of YAG and YAP transitions from YAG at a top of the layer of the mixed phase of YAG and YAP to YAP at a bottom of the layer of the mixed phase of YAG and YAP. A layer that transitions from a first ratio at a top of the layer to a second ratio at a bottom of the layer may be described as a graded layer or transition layer.

As an example, a graded layer of YAG and YAP may be applied by first applying YAP to a substrate and slowly decreasing the amount of YAP applied while increasing the amount of YAG applied such that the layer transitions from YAP at a bottom of the layer to a ratio of YAG and YAP with the ratio of YAG increasing until the top of the layer includes YAG and no YAP.

In some embodiments, the coating 100 includes a layer of YAG. The layer of YAG may be, in some embodiments, discrete from the layer of the mixed phase of YAG and YAP. In some embodiments, the layer of the mixed phase of YAG and YAP is between the layer of YAG and the substrate 102.

Some embodiments further include a layer of YAP with the layer of YAP being between the layer of the mixed phase of YAG and YAP and the substrate 102. The layer of YAP may be, in some embodiments, discrete from the layer of the mixed phase of YAG and YAP.

Some embodiments include a layer of YAM with the layer of YAM being between the layer of the mixed phase of YAG and YAP and the substrate 102. As an example, the coating 100 may include a layer of YAM as a bottom layer, a layer of YAP as a second layer, a layer of the mixed phase of YAG and YAP as a third layer, and a layer of YAG as a fourth layer. Other examples may exclude one or more of the above layers.

Some embodiments include a layer of a mixed phase of YAP and YAM. In some embodiments, the layer of the mixed phase of YAP and YAM is between the layer of the mixed phase of YAG and YAP and the substrate 102. As an example, the coating 100 may include a layer of YAM as a bottom layer, a layer of the mixed phase of YAM and YAP as a second layer, a layer of YAP as a third layer, a layer of the mixed phase of YAG and YAP as a fourth layer, and a layer of YAG as a fifth layer. Other examples may exclude one or more of the above layers.

Some embodiments include a layer of a mixed phase of YAP and YAM. In some embodiments, the layer of the mixed phase of YAP and YAM transitions from YAP at a top of the layer of the mixed phase of YAP and YAM to a ratio of YAP and YAM at a bottom of the layer of the mixed phase of YAP and YAM.

Some embodiments include a layer of yttria stabilized zirconia (YSZ). In some embodiments, the layer of YSZ is between the layer of the mixed phase of YAG and YAP and the substrate 102. In some embodiments, the layer of YSZ is between the layer of YAP and the substrate 102. In some embodiments, the layer of YSZ is between the mixed phase layer of YAP and YAM and the substrate 102. In some embodiments, the layer of YSZ is between the layer of YAM and the substrate 102.

Some embodiments include a layer of a mixed phase of YAP and YSZ. In some embodiments, the layer of the mixed phase of YAP and YSZ is between the layer of the mixed phase of YAG and YAP and the substrate 102. In some embodiments, the layer of the mixed phase of YAP and YSZ is between the layer of YAP and the substrate 102.

Some embodiments include a layer of a mixed phase of YAM and YSZ. In some embodiments, the layer of the mixed phase of YAM and YSZ is between the layer of YAM and the substrate 102. In some embodiments, the layer of the mixed phase of YAM and YSZ is between the mixed phase of YAM and YAM and the substrate 102.

In some embodiments, the coating 100 includes a layer of YAG and a layer of YAP between the layer of YAG and the substrate 102. That is, the coating 100 includes a discrete layer of YAG and a discrete layer of YAP. Some embodiments further include a layer of YAM. In some embodiments, the layer of YAM is between the layer of YAP and the substrate 102.

Some embodiments include a layer of YSZ. In some embodiments, the layer of YSZ is between the layer of YAP and the substrate. As an example, the coating 100 may include a layer of YSZ as a bottom layer, a layer of YAM as a second layer, a layer of YAP as a third layer, and a layer of YAG as a top layer. In addition, in some examples, the coating 100 may include one or more mixed phase layers between the above layers, where the mixed phase layer includes the above and below material in the mixed phase. That is, the coating 100 may include a layer of a mixed phase of YSZ and YAM between the layer of YSZ and the layer of YAM.

As another example, the coating 100 may include a layer of YSZ as a bottom layer, a layer of YAP as a second layer, and a layer of YAG as a top layer. In addition, in some examples, the coating 100 may include one or more mixed phase layers between the above layers, where the mixed phase layer includes the above and below material in the mixed phase. That is, the coating 100 may include a layer of a mixed phase of YSZ and YAM between the layer of YSZ and the layer of YAM.

Some embodiments include a layer of a mixed phase of YAP and YAM. In some embodiments, the layer of the mixed phase of YAP and YAM is between the layer of YAP and the substrate 102.

Some embodiments include a layer of a mixed phase of YAM and YSZ. In some embodiments, the layer of the mixed phase of YAM and YSZ is between the layer of YAM and the substrate 102. In some embodiments, the layer of the mixed phase of YAM and YSZ transitions from YAM at a top of the layer of the mixed phase of YAM and YSZ to a ratio of YAM and YSZ at a bottom of the layer of the mixed phase of YAM and YSZ.

Some embodiments include a layer of a mixed phase of YAP and YAM. In some embodiments, the layer of the mixed phase of YAP and YAM transitions from YAP at a top of the layer of the mixed phase of YAP and YAM to a ratio of YAP and YAM at a bottom of the layer of the mixed phase of YAP and YAM.

Figure 2:
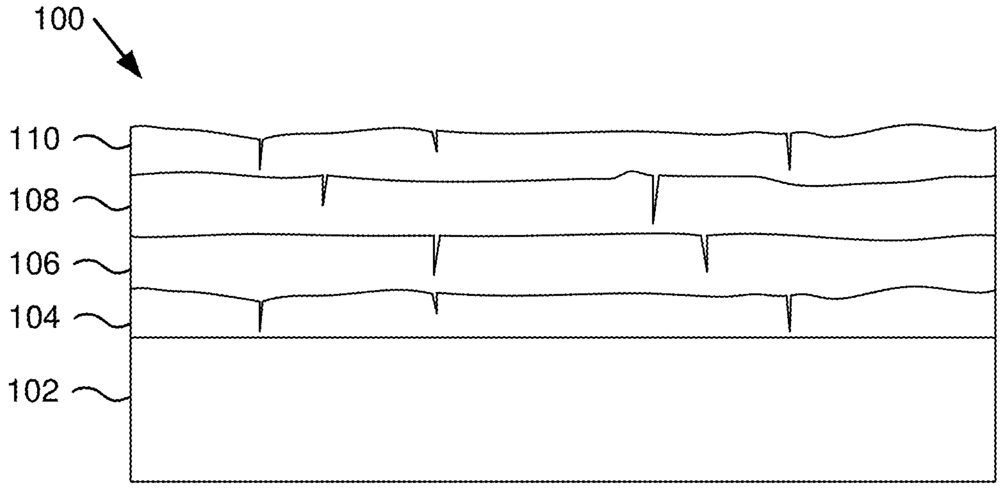
FIG. 2 is a schematic drawing depicting a substrate with a coating thereon that includes several layers in accordance with embodiments of the present invention.

FIG. 2 is a schematic drawing depicting a substrate 102 with a coating 100 thereon. The illustrated embodiment includes a first layer 104, a second layer 106, a third layer 108 and a fourth layer 110. The layers each may include the various combinations of materials and layers set forth herein.

In some embodiments, a coating 100 includes a single two-phase layer which is graded from pure yttrium aluminum garnet to a two-phase structure of yttrium aluminum garnet and yttrium aluminum perovskite constant phase ratio or a graded phase ratio with decreasing yttrium aluminum garnet including grading to pure yttrium aluminum perovskite with the volume fraction of yttrium aluminum perovskite in the range of one percent to ninety nine percent. That is, in some embodiments, the coating 100 includes only the layer of the mixed phase of YAP and YAG. Some embodiments may further include a top layer of YAG.

Some embodiments include a top layer of YAG and a second layer next the substrate of YAP. Some embodiments include a two-phase layer which is graded from YAG to a two-phase structure of YAG and YAP constant phase ratio or a graded phase ratio with decreasing YAG followed by a YAP layer next to the substrate 102.

In some embodiments, the coating 100 ends in a layer of yttrium perovskite garnet (YPG) followed by a layer of yttrium monoclinic garnet (YMG) next to the substrate 102. As an example, the coating 100 may include the layer of YMG as a first layer, a layer of YPG as a second layer, a layer of YAM as a third layer, a layer of YAP as a fourth layer, and a layer of YAG as a fifth layer. Some embodiments may exclude one or more of the above layers or include a layer of a mixed phase between two or more of the above layers.

In some embodiments, the coating 100 includes an yttrium perovskite garnet followed by a two-phase layer of YAP and YAM. In some embodiments, the two-phase layer includes YAP at a top surface and a graded ratio of YAM ending with any volume fraction of YAM from one percent to ninety nine percent, reaching the substrate with any possible phase fraction in that range. In some embodiments, the YAM phase fraction reaches a constant value after grading and continues to the substrate 102.

As an example, the coating 100 may include a layer of the mixed phase of YAM and YAP as a first layer, a layer of YPG as a second layer, a layer of YAM as a third layer, a layer of YAP as a fourth layer, and a layer of YAG as a fifth layer.

Some embodiments may exclude one or more of the above layers or include a layer of a mixed phase between two or more of the above layers.

In some embodiments, the coating 100 includes a final layer of YSZ next to a bond coat. In some embodiments, the coating 100 includes a two-phase layer next to the substrate 102 including a two-phase graded layer of YSZ and YAP with increasing YSZ content up to ninety nine percent. In some embodiments, the percentage of YSZ increases as the layer nears the substrate 102.

In some embodiments, the coating 100 includes a two-phase layer next to the substrate 102 including a two-phase graded layer of YSZ and YAM with increasing YSZ content up to ninety-nine percent. In some embodiments, the coating 100 includes an additional final layer next to the substrate of YSZ.

Some embodiments include both YAG and YAP as layers or as mixed phase regions including graded composition regions including a minimum of five volume percent of YAG.

Some embodiments include layers of YAG, YAP and YAM. Some embodiments include mixed phase regions with two per mixed phase region or all three per mixed phase region. In some embodiments, the coating includes a minimum of five volume percent of YAP and five volume percent of YAM.

Some embodiments include a single two-phase layer which is graded from pure YAG to a two-phase structure of YAG and YAP at constant phase ratio or a graded phase ratio with decreasing YAG including grading to pure YAP with the volume fraction of YAP in the range of one percent to ninety nine percent.

Some embodiments include a top layer of YAG and a second layer next the substrate 102 of YAP. Some embodiments include a top layer of YAG followed by a second layer of graded a graded two-phase layer as described above.

Some embodiments include a two-phase layer which is graded from YAG to a two-phase structure of YAG and YAP with a constant phase ratio or a graded phase ratio with decreasing YAG followed by a YAP layer next to the substrate 102. Some embodiments end in yttrium perovskite garnet followed by an yttrium monoclinic garnet layer next to the substrate 102.

Some embodiments end in yttrium perovskite garnet followed by a two-phase layer made of YAP at it top surface and mixed with YAM which is graded ending with any volume fraction of YAM from one percent to ninety nine percent, reaching the substrate with any possible phase fraction in that range. This includes the special case where the yttrium aluminum monoclinic phase fraction reaches a constant value after grading and continues to the substrate 102. Some embodiments include a final layer of YSZ next to a bond coat.

Some embodiments include a two-phase layer next to the substrate 102 including a two-phase graded layer of YSZ and YAP with increasing YSZ content up to ninety nine percent. Some embodiments include YAP followed by a two-phase layer next to the substrate 102 including a two-phase graded layer of YSZ and YAP with increasing YSZ content up to ninety nine percent.

Some embodiments include a two-phase layer next to the substrate including a two-phase graded layer of YSZ and YAM with increasing YSZ content up to ninety nine percent.

Some embodiments include a YAM layer followed by a two-phase layer next to the substrate 102 including a two-phase graded layer of YSZ and YAM with increasing YSZ content up to ninety nine percent. Some embodiments include an additional final layer next to the substrate 102 of YSZ.

Figure 3:
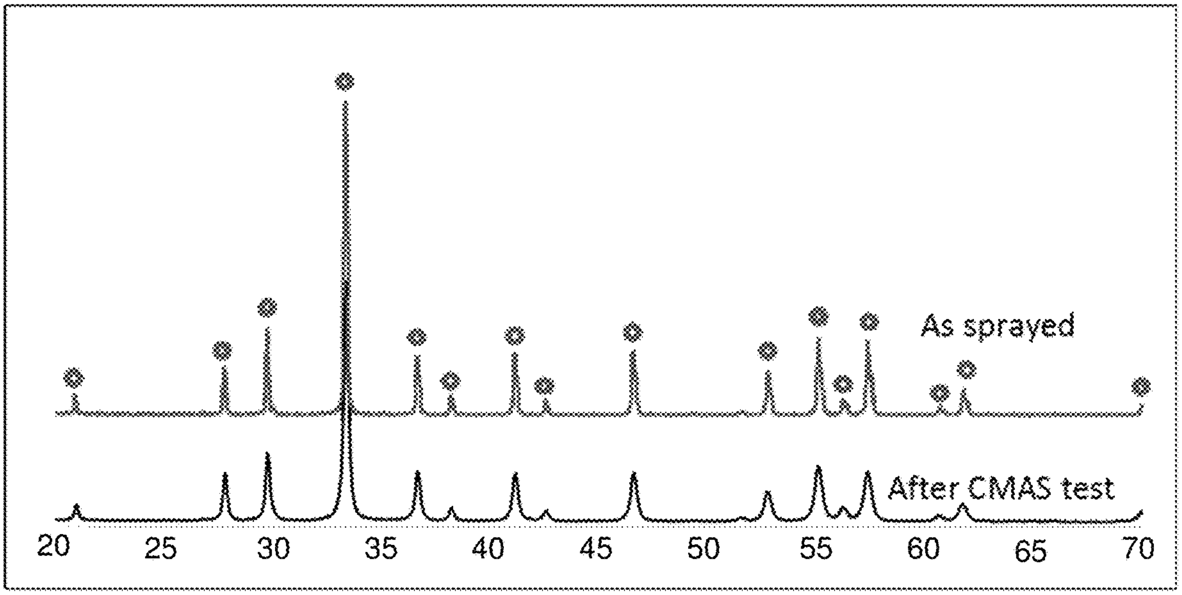
FIG. 3 depicts X-ray diffraction patterns of SPPS YAG coating, as sprayed and after reaction with 9 component CMAS at 1180° C. in a cyclic furnace after 20 one hour cycles in accordance with one embodiment of the present invention.

FIG. 3 depicts X-ray diffraction patterns of SPPS YAG coating, as sprayed and after reaction with 9 component CMAS at 1180° C. in a cyclic furnace after 20 one-hour cycles.

Figure 4:
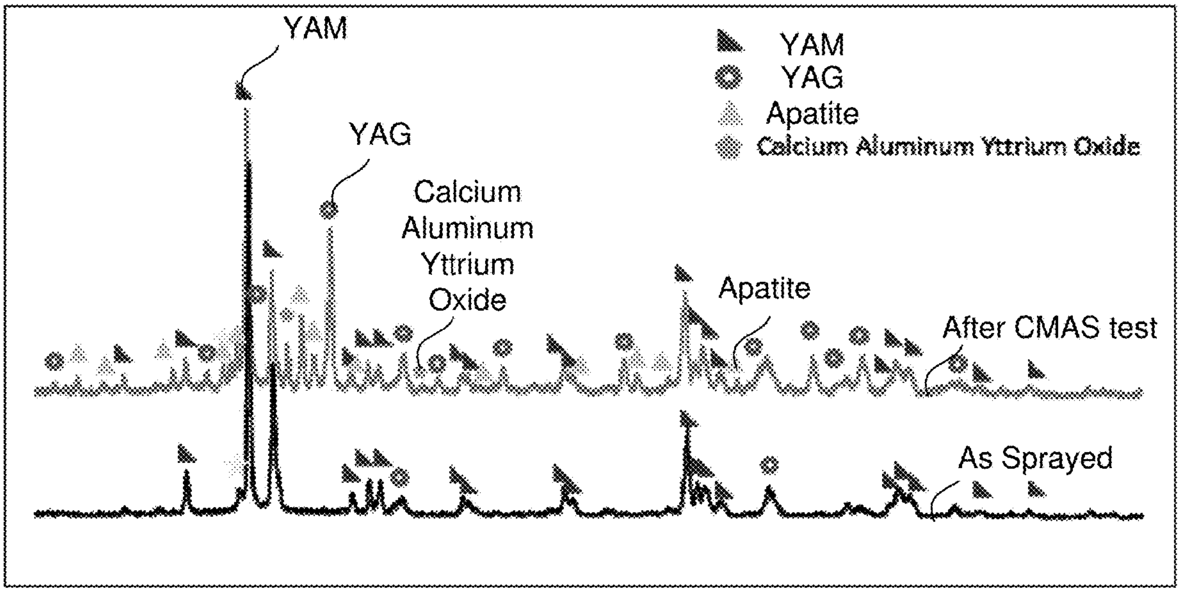
FIG. 4 depicts X-ray diffraction patterns of SPPS YAM coatings, as sprayed and after reaction with 9 component CMAS forming Apatite phase at 1180° C. in a cyclic furnace after 3 one hour cycles in accordance with one embodiment of the present invention.

FIG. 4 depicts X-ray diffraction patterns of SPPS YAM coatings, as sprayed and after reaction with 9 component CMAS forming Apatite phase at 1180° C. in a cyclic furnace after 3 one-hour cycles.

For embodiments described herein—the embodiments sometimes include an YSZ inner layer as dictated by the need to make the coating non-reactive with the thermally grown oxide and/or to exploit the higher fracture toughness of YSZ. In addition it is understood that YAG based on the equilibrium phase diagram is also stable with the thermally grown oxide (TGO) and can be used as the layer next to the TGO in cases where the limitation of high temperature phase stability of YSZ leads to a need for YAG or for any other reason can be used as an alternative to a YSZ inner layer based on cost and performance considerations.

For embodiments described herein—The phase fraction of all cited two-phase regions can be varied over the full allowable compositional range of the two-phases from one percent of phase A and ninety nine percent of phase B to ninety nine percent of phase A and one percent of phase B.

Embodiments described herein may include creating by thermal spray a coating that on the top surface is pure YAG, which is non-reactive with CMAS. Embodiments may further include creating below the YAG surface a two-phase region of YAP and YAG with sufficient YAP phase that there will initiate a CMAS blocking reaction after acceptable CMAS infiltration into the cracks 120 (see, for example FIG. 1). The fraction of YAP phase is to be from one percent to ninety-nine percent.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A coating on a substrate, comprising:
yttrium aluminum garnet (YAG); and
yttrium aluminum monoclinic (YAM); and
a layer of a mixed phase of YAM and yttrium aluminum perovskite (YAP), wherein the layer of the mixed phase of YAM and YAP transitions from YAM at a top of the layer of the mixed phase of YAM and YAP to a ratio of YAM and YAP at a bottom of the layer of the mixed phase of YAM and YAP.

2. The coating of claim 1, further comprising a layer of YAG and a layer of YAM between a layer of YAG and YAM and the substrate.

3. The coating of claim 1, comprising a layer of a mixed phase of YAG and YAM, and wherein the coating is a thermal barrier coating.

4. The coating of claim 3, wherein the layer of the mixed phase of YAG and YAM transitions from YAG at a top of the layer of the mixed phase of YAG and YAM to YAM at a bottom of the layer of the mixed phase of YAG and YAM.

5. The coating of claim 3, wherein the layer of the mixed phase of YAG and YAM comprises a consistent ratio of YAG and YAM.

6. The coating of claim 3, further comprising a minimum of five volume percent of yttrium aluminum perovskite (YAP).

7. The coating of claim 3, wherein the coating comprises a minimum of five volume percent of YAM.

8. The coating of claim 3, further comprising a layer of a mixed phase of YAM and yttria stabilized zirconia (YSZ), wherein the layer of the mixed phase of YAM and YSZ is between the layer of the mixed phase of YAG and YAM and the substrate.

9. The coating of claim 3, further comprising a layer of yttrium perovskite garnet (YPG) and a layer of yttrium monoclinic garnet (YMG), wherein the layer of YPG and the layer of YMG are between the layer of the mixed phase of YAG and YAM and the substrate.

10. The coating of claim 3, further comprising a layer of YSZ, wherein the layer of YSZ is between the layer of the mixed phase of YAG and YAM and the substrate.

11. The coating of claim 3, further comprising a layer of YAP, wherein the layer of YAP is between the layer of the mixed phase of YAG and YAM and the substrate.

12. The coating of claim 11, further comprising a layer of a mixed phase of YAM and YSZ, wherein the layer of the mixed phase of YAM and YSZ is between the layer of mixed phase of YAG and YAM and the substrate.

13. A coating on a substrate, comprising:
yttrium aluminum garnet (YAG);
yttrium aluminum monoclinic (YAM);
a layer of a mixed phase of YAG and YAM, and wherein the coating is a thermal barrier coating; and
a layer of a mixed phase of YAM and yttria stabilized zirconia (YSZ), wherein the layer of the mixed phase of YAM and YSZ is between the layer of the mixed phase of YAG and YAM and the substrate.

14. A coating on a substrate, comprising:
yttrium aluminum garnet (YAG);
yttrium aluminum monoclinic (YAM);
a layer of a mixed phase of YAG and YAM, and wherein the coating is a thermal barrier coating; and
a layer of YAP, wherein the layer of YAP is between the layer of the mixed phase of YAG and YAM and the substrate.

* * * * *